United States Patent [19]

Batcher

[11] 3,800,289

[45] Mar. 26, 1974

[54] MULTI-DIMENSIONAL ACCESS SOLID STATE MEMORY

[75] Inventor: Kenneth E. Batcher, Stow, Ohio

[73] Assignee: Goodyear Aerospace Corporation, Akron, Ohio

[22] Filed: May 15, 1972

[21] Appl. No.: 253,388

[52] U.S. Cl. .............................................. 340/172.5
[51] Int. Cl. ....... G06f 9/20, G11c 7/00, G11c 15/00
[58] Field of Search .................................... 340/172.5

[56] References Cited

UNITED STATES PATENTS

| | | | |
|---|---|---|---|
| 3,665,409 | 5/1972 | Miller et al. | 340/172.5 |
| 3,277,449 | 10/1966 | Shooman | 340/172.5 |
| 3,374,468 | 3/1968 | Muir | 340/172.5 |
| 3,553,651 | 1/1971 | Bird et al. | 340/172.5 |
| 3,339,181 | 8/1967 | Singleton et al. | 340/172.5 |
| 3,436,737 | 4/1969 | Iverson et al. | 340/172.5 |
| 3,350,692 | 10/1967 | Cagle et al. | 340/172.5 |

*Primary Examiner*—Gareth D. Shaw
*Attorney, Agent, or Firm*—Oldham & Oldham

[57] ABSTRACT

The invention relates to a novel memory organization which not only permits word-oriented accesses but also bit-oriented accesses and accesses with mixed orientations. In one operation it is possible to either read or write all bits of one word, or one bit of all words, or a few bits of many words, or many bits of a few words. The memory is comprised of widely-available random-access solid state memory modules. In essence, the invention operates with a unique ordering scheme to achieve the multi-access characteristic. The technique of the invention enables the use of large memory modules with very small pin counts because address lines are encoded and logic is utilized in selecting bits in accordance with the techniques of the invention. The technique is inexpensive and highly flexible.

18 Claims, 14 Drawing Figures

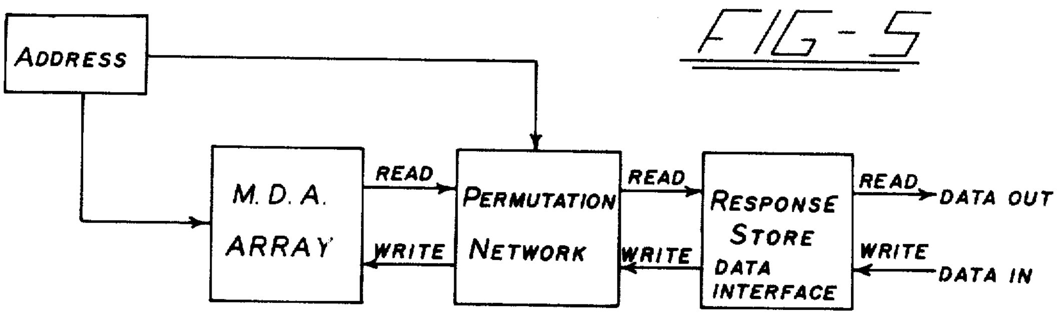
FIG-5
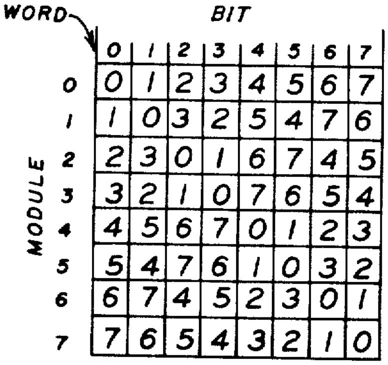
| MODULE \ BIT | 0 | 1 | 2 | 3 | 4 | 5 | 6 | 7 |
|---|---|---|---|---|---|---|---|---|
| 0 | 0 | 1 | 2 | 3 | 4 | 5 | 6 | 7 |
| 1 | 1 | 0 | 3 | 2 | 5 | 4 | 7 | 6 |
| 2 | 2 | 3 | 0 | 1 | 6 | 7 | 4 | 5 |
| 3 | 3 | 2 | 1 | 0 | 7 | 6 | 5 | 4 |
| 4 | 4 | 5 | 6 | 7 | 0 | 1 | 2 | 3 |
| 5 | 5 | 4 | 7 | 6 | 1 | 0 | 3 | 2 |
| 6 | 6 | 7 | 4 | 5 | 2 | 3 | 0 | 1 |
| 7 | 7 | 6 | 5 | 4 | 3 | 2 | 1 | 0 |
FIG-6
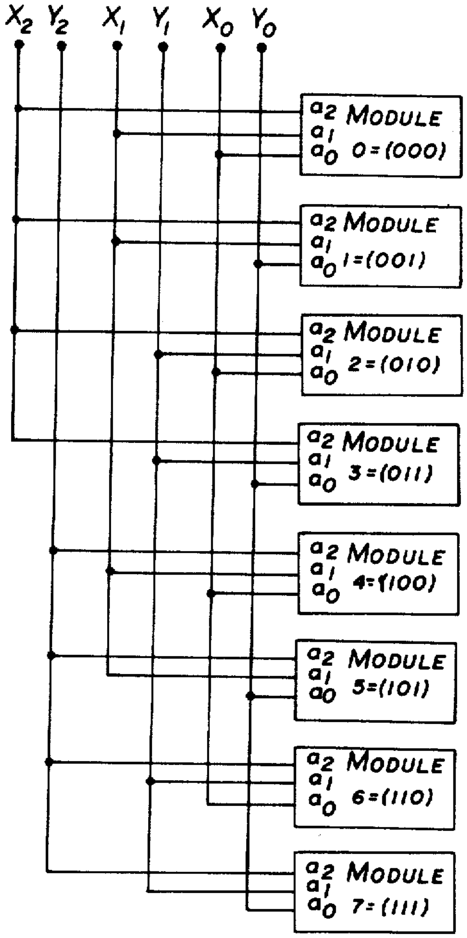
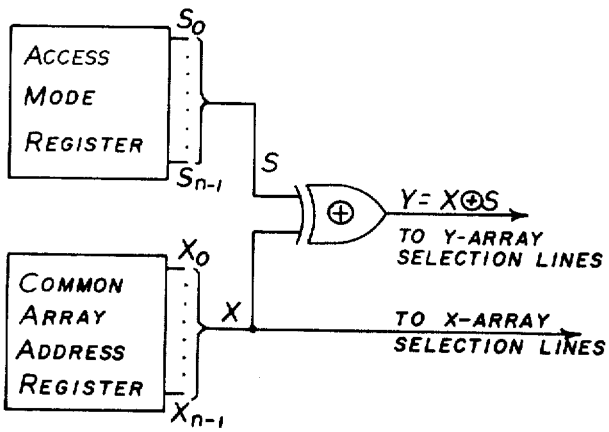
FIG-8
FIG-7

| Common Array Address Register | | | | | | | |
|---|---|---|---|---|---|---|---|
| $X_7$ | $X_6$ | $X_5$ | $X_4$ | $X_3$ | $X_2$ | $X_1$ | $X_0$ |
| a | b | c | d | e | f | g | h |

| Address Mode Register | | | | | | | |
|---|---|---|---|---|---|---|---|
| $S_7$ | $S_6$ | $S_5$ | $S_4$ | $S_3$ | $S_2$ | $S_1$ | $S_0$ |
| 0 | 0 | 0 | 1 | 1 | 1 | 1 | 1 |

BITS of WORDS

| BITS | | | | | | | | WORDS | | | | | | | |
|---|---|---|---|---|---|---|---|---|---|---|---|---|---|---|---|
| a | b | c | 0 | 0 | 0 | 0 | 0 | 0 | 0 | 0 | d | e | f | g | h |
| a | b | c | 0 | 0 | 0 | 0 | 1 | 0 | 0 | 1 | d | e | f | g | h |
| a | b | c | 0 | 0 | 0 | 1 | 0 | 0 | 1 | 0 | d | e | f | g | h |
| a | b | c | 0 | 0 | 0 | 1 | 1 | 0 | 1 | 1 | d | e | f | g | h |
| a | b | c | 0 | 0 | 1 | 0 | 0 | 1 | 0 | 0 | d | e | f | g | h |
| a | b | c | 0 | 0 | 1 | 0 | 1 | 1 | 0 | 1 | d | e | f | g | h |
| a | b | c | 0 | 0 | 1 | 1 | 0 | 1 | 1 | 0 | d | e | f | g | h |
| a | b | c | 0 | 0 | 1 | 1 | 1 | 1 | 1 | 1 | d | e | f | g | h |
| a | b | c | 0 | 1 | 0 | 0 | 0 | | | | | | | | |
| a | b | c | ⋮ | ⋮ | ⋮ | ⋮ | ⋮ | | | | | | | | |
| a | b | c | ⋮ | ⋮ | ⋮ | ⋮ | ⋮ | | | | | | | | |
| a | b | c | 1 | 1 | 1 | 1 | 1 | | | | | | | | |

FIG-9

| | $i_2$ | $i_1$ | $i_0$ |
|---|---|---|---|
| $I_0$ | 0 | 0 | 0 |
| $I_1$ | 0 | 0 | 1 |
| $I_2$ | 0 | 1 | 0 |
| $I_3$ | 0 | 1 | 1 |
| $I_4$ | 0 | 2 | 0 |
| $I_5$ | 0 | 2 | 1 |
| $I_6$ | 1 | 0 | 0 |
| $I_7$ | 1 | 0 | 1 |
| $I_8$ | 1 | 1 | 0 |
| $I_9$ | 1 | 1 | 1 |
| $I_{10}$ | 1 | 2 | 0 |
| $I_{11}$ | 1 | 2 | 1 |
| $I_{12}$ | 2 | 0 | 0 |
| ⋮ | ⋮ | ⋮ | ⋮ |
| $I_{18}$ | 3 | 0 | 0 |
| ⋮ | ⋮ | ⋮ | ⋮ |
| $I_{24}$ | 4 | 0 | 0 |
| ⋮ | ⋮ | ⋮ | ⋮ |
| $I_{29}$ | 4 | 2 | 1 |

$I = 6i_2 + 2i_1 + i_0$

FIG-11

| Common Array Address Register | | | | | | | |
|---|---|---|---|---|---|---|---|
| $X_7$ | $X_6$ | $X_5$ | $X_4$ | $X_3$ | $X_2$ | $X_1$ | $X_0$ |
| a | b | c | d | e | f | g | h |

| Address Mode Register | | | | | | | |
|---|---|---|---|---|---|---|---|
| $S_7$ | $S_6$ | $S_5$ | $S_4$ | $S_3$ | $S_2$ | $S_1$ | $S_0$ |
| 0 | 1 | 0 | 1 | 1 | 1 | 0 | 0 |

BITS of WORDS

| BITS | | | | | | | | WORDS | | | | | | | |
|---|---|---|---|---|---|---|---|---|---|---|---|---|---|---|---|
| a | 0 | c | 0 | 0 | 0 | g | h | 0 | b | 0 | d | e | f | 0 | 0 |
| a | 0 | c | 0 | 0 | 1 | g | h | 0 | b | 0 | d | e | f | 0 | 1 |
| a | 0 | c | 0 | 1 | 0 | g | h | 0 | b | 0 | d | e | f | 1 | 0 |
| a | 0 | c | 0 | 1 | 1 | g | h | 0 | b | 0 | d | e | f | 1 | 1 |
| a | 0 | c | 1 | 0 | 0 | g | h | 0 | b | 1 | d | e | f | 0 | 0 |
| a | 0 | c | 1 | 0 | 1 | g | h | 0 | b | 1 | d | e | f | ⋮ | ⋮ |
| a | 0 | c | 1 | 1 | 0 | g | h | 0 | b | 1 | d | e | f | 1 | 1 |
| a | 0 | c | 1 | 1 | 1 | g | h | 1 | b | 0 | d | e | f | 0 | 0 |
| a | 1 | c | 0 | 0 | 0 | g | h | 1 | b | 0 | d | e | f | ⋮ | ⋮ |
| a | 1 | c | 0 | 0 | 1 | g | h | 1 | b | 0 | d | e | f | 1 | 1 |
| a | 1 | c | 0 | 1 | 0 | g | h | 1 | b | 1 | d | e | f | 0 | 0 |
| a | 1 | c | ⋮ | ⋮ | ⋮ | g | h | 1 | b | 1 | d | e | f | ⋮ | ⋮ |
| a | 1 | c | 1 | 1 | 1 | g | h | 1 | b | 1 | d | e | f | 1 | 1 |

FIG-10

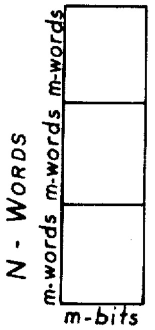

FIG-12

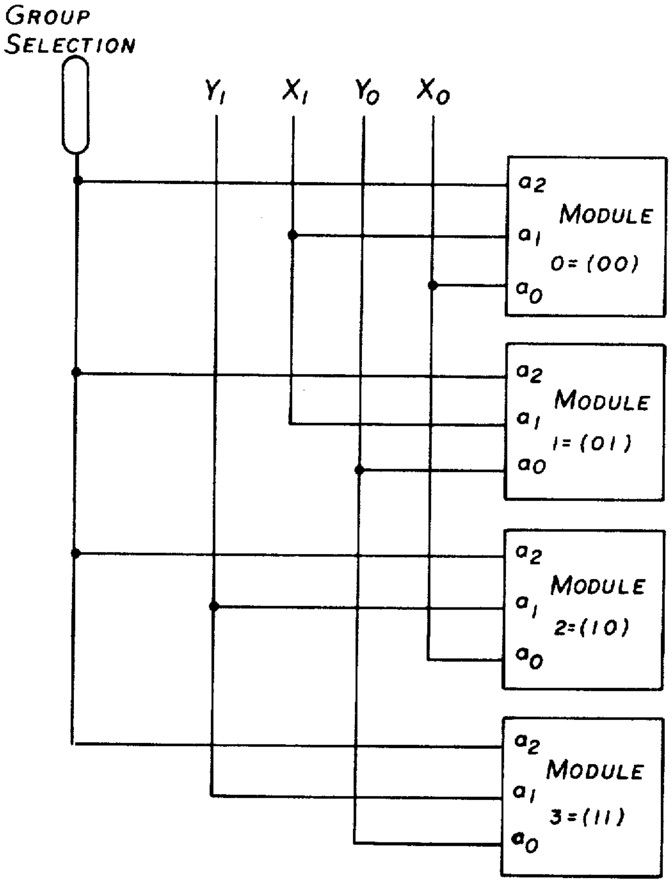
FIG-13
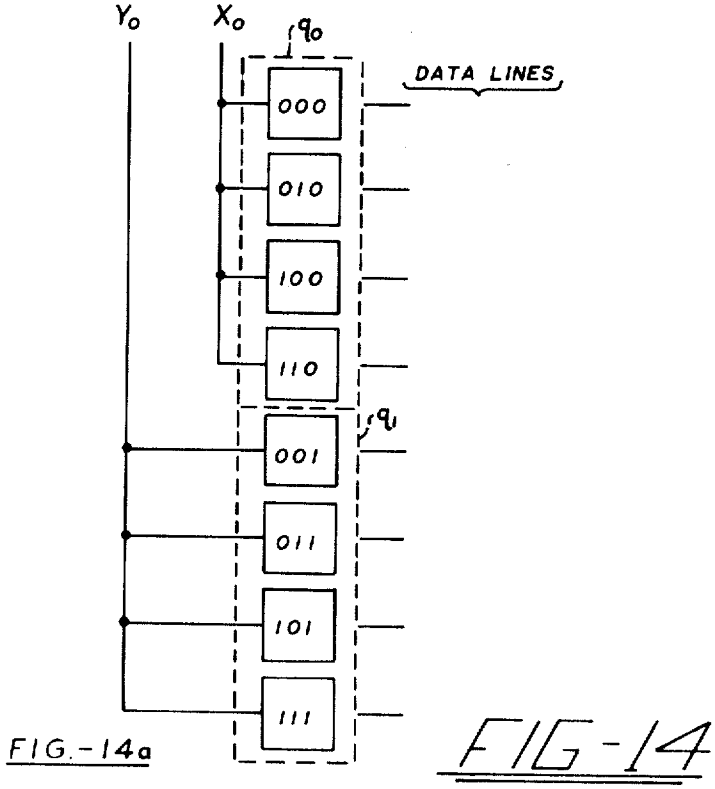
FIG.-14a
| WORDS | BITS 0 | BITS 1 |
|---|---|---|
| 000 | 000 | 001 |
| 001 | 001 | 000 |
| 010 | 010 | 011 |
| 011 | 011 | 010 |
| 100 | 100 | 101 |
| 101 | 101 | 100 |
| 110 | 110 | 111 |
| 111 | 111 | 110 |
MODULES
$W = M \oplus B$
FIG.-14b
FIG-14

MULTI-DIMENSIONAL ACCESS SOLID STATE MEMORY

Heretofore, it has been known that a square array of data may be stored in a set of memory modules in such a way that access to either rows or columns of the array is possible. Such an array has been called "skewed" storage. However, with skewed storage, each memory module requires its own individual adder the size of which is directly related to the size of the memory to be built. The hardware associated with the adders and the increase in memory access time due to the arithmetic computations in the adders makes this method extremely expensive, slow in operation, and very large in size. This type of storage requires a routing network for the data interface associated with the storage to put the row or column being accessed into an unpermuted order. This routing network cannot be sectioned without a large number of inter-section wire connections or control circuitry.

Therefore, it is the general object of the present invention to avoid the problems and inherent difficulties experienced with skewed storage by creating a memory array wherein each memory module does not require its own individual adder, and wherein interface with the memory array can uniquely be accomplished with a minimum of actual hardware, and wherein packaging of the components is readily and economically accomplished.

A further object of the invention is to provide a memory array which is designed to coordinate with a permutation network which is the subject of another patent application, more specifically identified hereinafter, so that the two in combination completely eliminate the problems inherent in skewed storage.

A further object of the invention is to provide a solid state multi-dimensional access memory which is accurate in operation, rapid in processing time, inexpensive in comparison with the present state of the art, and which is highly flexible to adapt to various uses.

The aforesaid objects of the invention and other objects which will become apparent as the description proceeds are achieved essentially by the method of arranging the data storage bits of a digital computer memory array system comprised of address line-encoded solid state memory modules each containing N bits, where N is any positive integer, such that access may be made to the data storage bits in each of three distinct modes comprising the steps of a. arranging N memory modules into a square array of N words by N bits;

b. making N the product of $n$ factors, $z_0$ through $z_{n-1}$, where each factor is greater than or equal to 2;

c. indexing the N modules, the N bits per module, the N words, and the N bits per word with vectors wherein the $k^{th}$ element is greater than or equal to 0 and less than or equal to $z_k-1$;

d. dividing the module address lines into subsets such that subset $k$ corresponds to the $k^{th}$ element of the bit address vector and contains at least $\log_2 z_k$ lines;

e. providing sets of array selection lines labelled $x_{k,j}$, where $0 \leq k \leq n-1$ and $0 \leq j \leq z_k-1$, such that each set contains at least $\log_2 z_k$ lines;

f. connecting the module address lines and array selection lines such that subset $k$ of the address lines of each module is connected to $x_{k,m}$ of the array selection lines, where $m_k$ is the $k^{th}$ element of the module index vector; and g. ordering the data storage bits of the array such that bit B of word W is stored in bit B of module M in accordance with the formula $M = B\ominus W = (b_{n-1}\ominus w_{n-1}, b_{n-2} \ominus w_{n-2}, \ldots, b_1\ominus w_1, b_0\ w_0)$, where means the difference modulo $z_k$.

For a better understanding of the invention, reference should be made to the accompanying drawings wherein:

FIG. 1, comprised of FIG. 1*a* through 1*c*, is a general illustration of the various accessing modes with which the invention deals, and are presented to clarify the understanding of the invention;

FIG. 5 is a basic block diagram of the accessing hardware associated with the memory of the instant invention;

FIG. 6 is a graphic tabular illustration of an 8 × 8 memory array utilizing the techniques of the instant invention;

FIG. 7 is a block diagram illustration of the module arrangement showing module address and array selection line connections;

FIG. 8 is a block diagram illustration of the operation mode selection circuitry of the instant invention;

FIG. 9 is a graphic tabular illustration of the arrangement to achieve contiguous bit mixed mode accessing of the memory;

FIG. 10 is a graphic tabular illustration of the general mixed mode accessing;

FIG. 11 is a graphic tabular illustration of the indexing for an $n \times n$ multi-dimensional accessing array in accordance with the principles of the invention;

FIG. 12 is a graphic illustration of the division of a non-square array into $q$-square arrays;

FIG. 13 is a block diagram illustration of the address connections for an 8 × 4 under-square array where $q$ equals 2; and FIG. 14 is comprised of sub-FIG. 14*a* and 14*b* which illustrate the construction and data storage pattern for over-square memories.

BACKGROUND OF THE INVENTION

Figures 1, 1A, 1B, 1C:
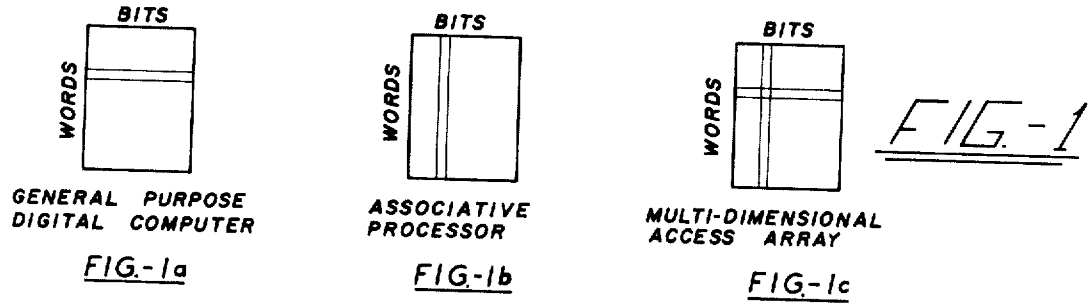

This invention presents a novel computer memory array organization which not only permits word-oriented accesses, but also bit-oriented accesses and accesses with mixed orientations. Referring now to FIG. 1, it can be noted that the general purpose digital computer shown by FIG. 1*a* functions in a word-oriented mode. An associative processor, shown by FIG. 1*b*, operates in a bit-oriented mode. The multi-dimensional access solid state memory however is capable of operating in either a word-oriented or a bit-oriented mode, as shown by FIG. 1*c*. With this invention it will be possible, in one operation, to simultaneously either read or write all bits of one word, or one bit of all words, or a few bits of many words, or many bits of a few words. With such a memory it is possible to build a processor which not only handles conventional one-word-at-a-time operations but also many-word, one-bit-at-a-time associative processor (AP) type operations.

Recent approaches to multi-mode accessing of data storage arrays have culminated in the conception of a skewed array as defined in Report No. 297 by Yoichi Muraoka of the Department of Computer Science of the University of Illinois at Urbana, Ill. Such a storage may readily be developed, by one skilled in the art, from commonly available digital solid state memory modules similar to those discussed hereinafter.

Figure 2:
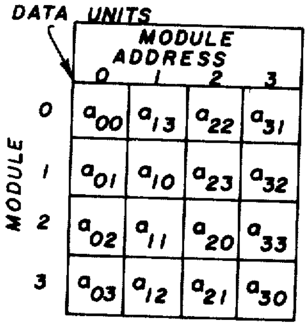
FIG. 2 is a graphic illustration of a skewed array storage pattern.

FIG. 2 illustrates the storage of such a skewed array utilizing memory modules capable of storing four units of data, where a unit of data refers to any stored unit of information, not just a conventional bit. Note that the vertical axis represents the indices of memory modules, the horizontal axis represents the indices of the memory module addresses, and the boxes themselves contain the indices of the data units stored. For example, data unit $a_{2,1}$ is stored at address 2 of memory module 3. Two distinguishing characteristics of skewed storage should be observed. First, the abscissas of the data unit indices are the same as the module addresses of the memory modules in which the data units are stored. Secondly, the ordinates of the data unit indices are equal to the module indices added modulo the number of modules to the module address.

Figure 3:
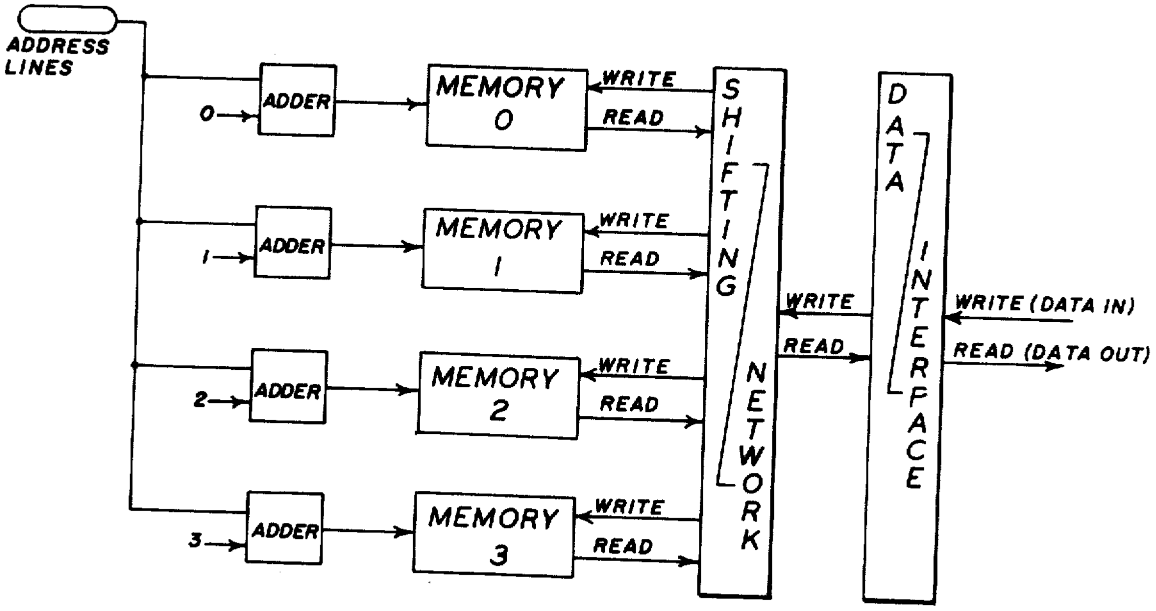
FIG. 3 is a block diagram of the accessing hardware for skewed storage.

The data units of a skewed storage array are capable of being accessed in two modes. Access may be made to all data units having the same abscissa, abscissa-oriented mode, or to all data units having the same ordinate, ordinate-oriented mode. Now consider the circuitry in FIG. 3 which is typical of that used to access the data units stored in the skewed array represented by FIG. 2. The address lines are used for both the abscissa address for abscissa-oriented operation, and for the ordinate address for ordinate-oriented operation. The adders associated with each memory module add modulo the number of memory modules in the system. Each such adder, when called upon to function, adds the address being sought to the index of the memory module with which the adder is associated. The adder will function when operating in ordinate-oriented mode and will not function when operating in abscissa-oriented mode. For example, when searching for all data units having the same abscissa, the binary equivalent of the abscissa would be placed on the address lines. The adders do not function, and consequently, each memory module will be accessed at its address equivalent to the abscissa. Thus, since the abscissa of the data unit indices are equivalent to the memory module addresses in which they are stored, each memory module accesses that data unit which has the abscissa being sought. To access all data units having the same ordinate, the binary equivalent of that ordinate would be placed on the address line. In this situation, the adders do function, adding modulo the number of memory modules (four) the address being sought to the respective memory module index. Consequently, each memory module will access that data unit having the ordinate whose binary equivalent is evidenced on the address lines.

Figures 4, 4A, 4B:
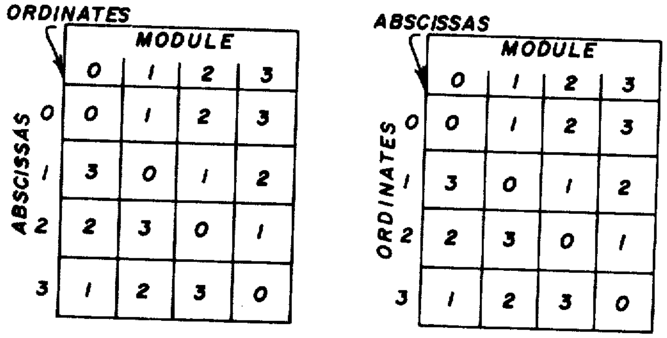
FIG. 4 is a graphic tabular illustration of the word-oriented mode and bit-oriented mode in 4*a* and 4*b* respectively, which show the word-oriented mode and bit-oriented mode of the instant invention in a 4 × 4 array.

While skewed storage arrays allow accessing of the data units in two distinct modes, it should be noted that in neither mode of operation are the data units accessed in order as referenced to the memory modules. FIG. 4 illustrates the data unit order relationships for both modes of operation. In abscissa-oriented mode, FIG. 4*a*, data units having abscissas of 0 will appear in the same ordinate order as the modules. The ordinate order of those data units having abscissas of 1 is shifted once to the right as referenced to the memory module indices. Similarly, the ordinate orders of those data units having abscissas of 2 and 3 are shifted from the module order two and three places to the right respectively. Note also that in ordinate-oriented mode, illustrated in FIG. 4*b*, the abscissa order as referenced to the memory modules is similarly shifted. Since it is desirable that the data units accessed will maintain a consistent order regardless of the mode of accessing, a shifting network must be provided whereby the accessed data may maintain a consistent order on a data interface regardless of the mode of accessing. When writing data from the data interface into memory, the data is placed in the data interface in an ordered manner and then shifted a number of places equivalent to the address on the address lines before it is written into memory. When reading data from memory, the shifting network shifts the data from memory the number of times indicated by the address on the address lines such that the data will be in a proper order on the data interface.

DIFFICULTIES WITH SKEWED MEMORY

Two inherent drawbacks of skewed storage are clearly evident. First, each memory module requires its own individual adder, the size of which is directly related to the size of the storage to be built. The hardware associated with the adders and the increase in storage access time due to the arithmetic computations in the adders make their elimination desirable. Secondly, the shift network required for the data interface associated with skewed storage is not readily divisible into unique sections such that each unique section may be packaged upon an individual printed circuit board with a minimum of interboard wire connections necessary. Using present state of the art logic circuit packaging, skewed storage of any practical size requires a shifting network populating numerous printed circuit boards. Numerous interboard wire connections or complex control circuits are then necessary to unify the shifting network. The indivisibility of the shifting network makes it desirable to replace this network with one which may be uniquely divided and placed upon printed circuit boards requiring a minimum of interboard wire connections and control circuitry.

The instant invention alleviates the two major problems discussed in the preceding paragraph. FIG. 5 illustrates a block diagram of the accessing hardware necessary for an MDA array. Notice that the adders required for skewed storage have been totally eliminated, and the shifting network has been replaced by a permutation network. This permutation network is described in copending patent application Ser. No. 291,850, filed Sept. 25, 1972 and assigned to Goodyear Aerospace Corporation of Akron, Ohio. The permutation network is capable of being divided into unique sections such that each section may be packaged upon an individual printed circuit board with a minimum of interboard wire connections and control circuitry necessary. The response store circuit or data interface is thoroughly discussed in copending patent application Ser. No. 1,495 filed December 29, 1969. A detailed description of memory module addressing and data permuting is set forth in detail hereinafter.

Mention should also be made that this invention compares very favorably with logic-in-memory arrays. A logic-in-memory array is composed of a rectangular array of cells, each cell containing some logic as well as storage; the logic is utilized in selecting bits in accordance with the mode of operation. Because interconnections are necessary for both the logic circuitry and the storage bits, many connections are present in such an array and modularization is limited by the number of package pins required in a multi-cell module. In the instant MDA array, each multi-bit module has but a few package pins since the address lines can be encoded (n address lines are required for $2^n$ bits) and the other lines only communicate with the selected bit. An increase of one address line to a module allows the number of bits stored in that module to be doubled and hence memory modules having large storage capacity and small pin counts are possible.

GENERAL DESCRIPTION

If $n$ is a non-negative integer, a multi-dimensional access (MDA) array of $2^n$ words, with $2^n$ bits per word, may be constructed using $2^n$ memory units or modules, each containing $2^n$ bits. Of course, smaller memory units or modules may be combined to make up a $2^n$ bit unit or module. For purposes of this description, memory units or modules shall be referred to as modules and will be similar in nature to the IM 5503, 256 bit bipolar random-access solid state memory available from Intersil Memory Corporation of Cupertino, Calif. Another typical memory module suitable for the teachings of this invention is the Fairchild Semiconductor Model No. 93410 manufactured by Fairchild Semiconductor, a division of Fairchild Camera and Instrument Corporation. The Fairchild memory module is described in at least certain of the following U.S. Pat. Nos.: 2,981,977; 3,015,048; 3,025,589; 3,064,167; 3,108,359; and 3,117,260. Such a $2^n$ bit module has $n$ binary address inputs by which any of the $2^n$ bits can be selected. Outputs and other inputs to the module control whether the selected bit is to be read or written. For purposes of this description, mention shall be made of accessing bits rather than reading or writing bits. When a bit is accessed it may then be either read or written, depending upon the function that is indicated by the state of the module's control lines.

The $2^n$ modules, the $2^n$ bits per module, the $2^n$ memory words, and the $2^n$ bits per memory word are each indexed using the integers 0 through $2^n-1$. Each index can be expressed as an $n$-element binary vector; for example, any index I can be expressed as $(i_{n-1}, i_{n-2}, i_{n-3}, \ldots, i_2, i_1, i_0)$ where each of the $i$'s is a 0 or a 1, a binary level, and $$I=\sum_{k=0}^{n-1}2^k i_k.$$

In conjunction with the above-mentioned indexing it should be noted that throughout this description, the following Boolean operations shall be used; negation, intersection, and ring-sum. If $x$ is a Boolean variable, being either a 0 or 1, then the negation of $x$, written as $\overline{x}$, is defined by the following table:

| $x$ | $\overline{x}$ |
|---|---|
| 0 | 1 |
| 1 | 0 |

If $x$ and $y$ are Boolean variables, then the intersection of $x$ and $y$, written as $xy$, and the ring-sum of $x$ and $y$, written as $x \oplus y$, are defined in the tables:

| $x$ | $y$ | $xy$ |
|---|---|---|
| 0 | 0 | 0 |
| 0 | 1 | 0 |
| 1 | 0 | 0 |
| 1 | 1 | 1 |

| $x$ | $y$ | $x \oplus y$ |
|---|---|---|
| 0 | 0 | 0 |
| 0 | 1 | 1 |
| 1 | 0 | 1 |
| 1 | 1 | 0 |

The operations of negation, intersection, and ring-sum may be applied to vectors of $n$ Boolean variables. The negation of a vector X, written as $\overline{X}$, is simply a vector of the same length as X with each component negated. In other words, if $\overline{X} = (\overline{x}_{n-1}, \overline{x}_{n-2}, \ldots, \overline{x}_1, \overline{x}_0)$ then $X = (x_{n-1}, x_{n-2}, \ldots, x_1, x_0)$.

The intersection of two vectors each having $n$ components is simply a vector of $n$ components in which each component is the intersection of the corresponding components of the two vectors. In other words, if $X = (x_{n-1}, x_{n-2}, \ldots, x_1, x_0)$ and $Y = (y_{n-1}, y_{n-2}, \ldots, y_1, y_0)$ then $XY = (x_{n-1}\, y_{n-1}, x_{n-2}\, y_{n-2}, \ldots, x_1 y_1, x_0 y_0)$ Similarly, the ring-sum of two vectors each containing $n$ components is a vector of $n$ components whose components are the ring sums of the corresponding components of the two vectors. In other words, if X and Y are defined as above, then $X \oplus Y = (x_{n-1} \oplus y_{n-1}, x_{n-2} \oplus y_{n-2}, \ldots, x_1 \oplus y_1, x_0 \oplus y_0)$.

Consider now the data storage arrangement of an MDA array. The rules for storing data are as follows:

bit $B = (b_{n-1}, b_{n-2}, \ldots, b_1, b_0)$ of
word $W = (w_{n-1}, w_{n-2}, \ldots, w_1, w_0)$ is stored in
bit $B = (b_{n-1}, b_{n-2}, \ldots, b_1, b_0)$ of
module $M = (m_{n-1}, m_{n-2}, \ldots, m_1, m_0)$, where $M = B \oplus W$.

Similarly, bit $B$ of module $M$ contains bit $B$ of word $W$, where $W = M \oplus B$. FIG. 6 illustrates the relationship between modules, words, bits of modules, and bits of words for an eight word by eight bit MDA array. The horizontal axis represents bit indices, the vertical axis represents module indices, and the boxes themselves represent word indices. The chart illustrates that $M = B \oplus W$ and that $W = M \oplus B$.

Consider now the actual physical construction of a typical MDA array and more specifically, that of an eight word by eight bit array. Each memory module has $n$ address lines indexed using the integers 0 through $n-1$. If $a_k$ is the state of address line $k$, where $0 \leq k \leq n-1$, then the module selects bit $(a_{n-1}, a_{n-2}, \ldots, a_1, a_0)$. In other words, each module is accessed at the bit whose address appears on the module's address lines. There are $2n$ selection lines into the array labeled $(x_{n-1}, y_{n-1}, x_{n-2}, y_{n-2}, \ldots, x_1, y_1, x_0, y_0)$; the set of $x$ selection lines shall be designated by $X = (x_{n-1}, x_{n-2}, \ldots, x_1, x_0)$ and the set of $y$ selection lines by $Y = (y_{n-1}, y_{n-2}, \ldots, y_1, y_0)$. The $n$ address lines of each module connect to $n$ of these $X-Y$ selection lines. Only one address line per module will go to any particular selection line. The rule for connecting module address lines to array selection lines may be expressed as follows: address line $k$ of module $M$ connects to $x_k$ if $m_k = 0$, or to $y_k$ if $m_k = 1$. As a result, each $x$ line connects to one-half of the modules and the corresponding $y$ line to the other half. FIG. 7 illustrates the module address-array selection line connections for an eight word by eight bit memory. Note that for module 0, address line $a_0$ connects to $x_0$, $a_1$ to $x_1$, and $a_2$ to $x_2$ since all $m_k = 0$. Similarly, for module 7, $a_0$ connects to $y_0$, $a_1$ to $y_1$, and $a_2$ to $y_2$, since all $m_k = 1$. For module 5, $a_0$ connects to $y_0$ since $m_0 = 1$, $a_1$ connects to $x_1$ since $m_1 = 0$, and $a_2$ connects to $y_2$ since $m_2 = 1$.

Consider now the operation of an MDA array in bit-oriented, or associative processor, type mode. To access any bit B of all words, the state of the X selection lines and the state of the Y selection lines are set to equal B. That is, $X = Y = B$. Each module then selects bit $B$ of its contents which is bit $B$ of word $(B\oplus M)$. The result is that bit $B$ of each word is accessed. Note however that the words, as referenced to the modules, are not in order and the word order varies as a function of B; $W = B\oplus M$. Therefore, a permutation network is required such that the data associated with each word's bits may be placed at the same location for each bit. The permutation network arranges the order of data into or out of the data interface such that the data associated with each memory module may always be placed at some unique position P, where $P = X\oplus M$. In bit-oriented mode, $X = B$; therefore, $P = B\oplus M = W$; that is, in bit-oriented mode, the data associated with any particular word $W$ will always be placed at the same unique location $P$ in the data interface.

Now consider the operation of an MDA array in word-oriented mode, or for use in a general purpose digital computer. If $W$ is the index of the memory word to be accessed then X is set to equal W. At this point, all memory module address lines of those modules where $m_k = 0$ will be at the state $w_k$ or $w_k\oplus m_k$. Similarly, if Y is set to equal $\overline{W}$ then all memory module address lines to those modules where $m_k = 1$ will be at the state $\bar{w}_k$ or $w_k\oplus m_k$. Therefore, considering the X and Y array selection lines together it follows that each module M receives address $B = W\oplus M$. At address B of module M is bit B of word $(M\oplus B) = (M\oplus W\oplus M) = W$. Hence each bit of word W may be accessed by setting $X = W$ and $Y = \overline{W}$. The accessed bits however are not in order as referenced to the modules, but vary as a function of W; $B = W\oplus M$. Again, if a permutation network arranges the order of data into or out of the data interface such that the data associated with each memory module may always be placed at some unique data interface position $P = M\oplus X$, then position $P = M\oplus W = M\oplus M\oplus B = B$. Hence the data interface position P is the same as bit position B and the word will be in proper bit order in the data interface.

Thus it can be seen that in accessing one bit of all words the bits will be in order in the data interface according to their word and similarly, in accessing all bits of one word the word will be in proper bit order in the data interface.

The MDA array may also operate in a mixed mode orientation; that is, it may access selected bits of selected words. Recall that bit-oriented access requires $x_k = y_k$ for all $k$ and similarly, word-oriented access requires $x_k = \bar{y}_k$ for all $l$. If some $x_k\ y_k$ and some $x_k = \bar{y}_k$, then some bits of some words will be accessed.

The module address-array selection line connection rule shows that module M is addressed at $X\ \overline{M}\oplus Y\ M$. This selects bit $B = X\ \overline{M}\oplus Y\ M$ of word $W = B\oplus M = X\ \overline{M}\oplus YM\oplus M = X\overline{M}\oplus\overline{Y}M$. It follows then that if for some $k$, $x_k = y_k$ then $b_k = x_k$ and $b_k$ is independent of $m_k$. If for some $k$, $x_k = \bar{y}_k$ then $w_k = x_k$, and $w_k$ is independent of $m_k$. Thus, each $x_k$ refers to either a bit address index or a word address index depending upon whether $y_k =$ $_k$ or $y_k = \bar{x}_k$, respectively.

In the MDA array the x selection lines, X, receive the common array address, a word address, or a bit address depending upon the state of the y selection lines, Y. As discussed above, the mode of operation, bit-oriented or word-oriented, is dependent upon the relationship between X and Y. If $Y = X\oplus S$ then it can be seen that the mode of operation is dependent upon the state of S; when all $x_k = 0$, operation is in the bit mode $(Y = X)$; when all $s_k = 1$, operation is in the word mode $(Y = \overline{X})$; and when some $s_k = 0$ and some $s_k = 1$, operation is in the mixed mode ($y_k = x_k$ for some $k$ and $y_k = \bar{x}_k$ for other $k$).

One way of driving the array selection lines is from two $n$-bit registers as shown in FIG. 8. A common array address register sets the state of the x array selection lines. The mode of operation is then determined by the state of the address mode register whose outputs are added modulo 2 to those of the common array address register to set the state of the Y array selection lines.

Recall that the general accessing rule is that module M receives address $X\overline{M}\oplus YM$. This accesses bit $X\overline{M}\oplus YM$ of word $X\overline{M}\oplus\overline{Y}M$. It follows then that operating in any mode S at any common array address X, module M is accessed at $X\overline{M}\oplus(X\oplus S)\ M = X\oplus SM$. By the storage rule this is bit X SM of word $X\ SM\ M = X\ SM$. Depending then upon the contents of the address mode register, various combinations of words and bits of words may be accessed. If for some integer $j$, where $1 \leq j \leq n-1$, $s_k = 0$ for all $k \geq j$ and $s_k = 1$ for all $k<j$, then $y_k = \bar{x}_k$ for all $k < j$ (bit mode) and $y_k = x_k$ for all $k<j$ (word mode). The result is that the upper $n-j$ indices of the bit addresses and the lower $j$ indices of the word addresses are constant with respect to M. The lower $j$ indices of the bit addresses and the upper $n-j$ indices of the word addresses then run through all possible combinations of 0's and 1's as M varies. Consequently, $2^j$ bits of $2^{n-j}$ words are accessed. The set of $2^j$ bits accessed is contiguous. The set of $2^{n-j}$ words is not. Specifically, the first $2^j$ bits of every $2^{jth}$ word have been accessed. An example of this type of accessing for a 256 word by 256 bit array is shown in FIG. 9. Note that for this example, $j = 5$ and $n = 8$. The contents of the common array address register are designated by the letters $a$ through $h$ which of course would represent some binary number. It can be seen by applying the formulae $B = X\oplus SM$ and $W = X\oplus\overline{S}M$ for all M that the first 32, $2^5$, bits of every 32nd word will be accessed.

Of course the most common type of mixed mode operation will be similar to that as discussed above, the first $2^j$ contiguous bits of every $2^{jth}$ word. However, it is understandable that a myriad of combinations of words and bits of words may be accessed. The basic rule is that where the bit indices vary the word indices remain constant and conversely where the word indices vary the bit indices remain constant; that is, where $s_k$ $= 0$, $b_k$ remains constant nd $w_k$ varies with M and similarly, where $s_k = 1$, $w_k$ remains constant and $b_k$ varies with M. A generalized form of mixed orientation access fo a 256 word by 256 bit memory is shown in FIG. 10.

Again, in mixed-mode orientation, the words and bits of words are not in order. If the data associated with each memory module M is placed in some unique position $P = X \oplus M$ in the data interface, the words and bits of words will be in order. If $P = X \oplus M$ then $M = X \oplus P$ and position P in th data interface will contain bit $[X \oplus S(X \oplus P)]$ of word $[X \oplus \bar{S}(X \oplus P)]$ which is bit $(\bar{S}X \oplus SP)$ of word $(SX \oplus \bar{S}P)$. It can be seen then that the permutation network satisfies the desirable provision that when a contiguous set of bits of a word are accessed the bits will appear in order in the data interface. When $2^j$ bits of every $2^{jth}$ word are accessed the $2^j$ bits of each word will appear in the same order in the data interface as they appear in the memory word. The groups of $2^j$ bits will also appear in the same order in the data interface as do the words from which the groups of $2^j$ bits come.

In general then, with $2^n$ random-access solid state memory modules, each containing $2^n$ bits, a $2^n$ word by $2^n$ bit per word MDA array can be constructed which allows simultaneous access (for reading or for writing) to any one bit of all words, all bits of any one word, or to certain sets of $2^j$ bits of every $2^{jth}$ word. For convenient addressing two $n$-bit registers can be provided. A common array address register supplies the address to the X array selection lines, and an access mode register, containing S, determines the mode of operation of the array. If all $s_k = 0$, then one bit of all words is accessed; if all $s_k = 1$, then all bits of one word are accessed; if some $s_k = 1$ and some $s_k = 0$, then parts of some words are accessed. A network to permute the read and write data so as to have a consistent order on the data interface is required. This network is controlled by the common array address register such that the data order depends only on the accessing mode of operation, the contents of the access mode register.

Of course there are alternate methods by which an MDA array may be developed. One such method is to define a different storage pattern by flipping the word index vector end-for-end; transpose $W = (w_{n-1}, w_{n-2}, \ldots, w_1, w_0)$ to $\overleftarrow{W} = (w_0, w_1, \ldots, w_{n-2}, w_{n-1})$. This in effect amounts to nothing more than relabeling the words. There are however two chief differences with this type of arrangement. Now, by definition, $\overleftarrow{W} = M \oplus B$. As a result, for bit-oriented access, where $X = Y = B$, it can be seen that data interface position $P = X \oplus M = B \oplus M = \overleftarrow{W}$. In other words, in bit-oriented access the data in the data interface associated with the bits accessed is in reverse order of the words accessed; $p_k = w_{n-1-k}$. In word-oriented access no such problem exists. This alternate array arrangement has its greatest attribute in operating in mixed-mode orientations. Here it is possible to obtain contiguous sets of bits of contiguous sets of words. In this arrangement module M is accessed at $X\bar{M} \oplus YM$, which selects bit $X \oplus SM$ of word $\overleftarrow{X} + \overleftarrow{\bar{S}M}$. Note that here, position P on the data interface will contain bit $\bar{S}X \oplus SP$ of word $\overleftarrow{\bar{S}X \oplus SP}$. Now, if for some number $j$ where $1 \leq j \leq n-1$, $s_k = 0$ for all $k \geq j$ then $b_k = x_k$ and $w_k = x_{n-1-k} + m_{n-1-k}$ for all $k \geq j$; and if $s_k = 1$ for all $k < j$ then $b_k = x_k + m_k$ and $w_k = x_{n-1-k}$ for all $k < j$. The result is that the upper $n-j$ bit indices and the upper $j$ word indices are independent of M. The lower $j$ bit indices and the lower $n-j$ word indices vary with M, receiving all possible combinations of 0's and 1's. Hence $2^j$ bits of $2^{n-j}$ words are accessed. All $2^j$ bits are contiguous as are the $2^{n-j}$ words.

The description thus far has been such that the modules, the bits in each module, the words, and the bits in each word might be indexed with binary vectors. The storage pattern could be derived by relating each component of the module index vector to corresponding components of the word index vectors and bit index vectors. A more generalized MDA array, N words by N bits, might be constructed by using N memory modules each containing N bits. This more generalized array might be described by allowing other integers beside 2 to be radices of the vector components. For purposes of this description let $Z = (z_{n-1}, z_{n-2}, \ldots, z_1, z_0)$ be a set of $n$, not-necessarily unique, integers; where $n \geq 1$ and $z_k \geq 2$ for all $k$. Further, let $$N = \prod_{k=0}^{n-1} z_k$$

and let the N modules, the N bits per module, the N memory words, and the N bits per memory word each be indexed with a vector of $n$ integers, $(n_{n-1}, i_{n-2}, \ldots, i_1, i_0)$, where $0 \leq i_k \leq z_k - 1$ for $0 \leq k \leq n-1$. FIG. 11 shows the development of the values of the components of any index I of an N by N MDA array where N = 30. Let $z_0 = 2$, $z_1 = 3$, and $z_2 = 5$; therefore, $n = 3$. Any index I may then be expressed as a vector of $n$ (3) integers. Since $0 \leq i_k \leq z_k - 1$, the component $i_0$ may have values of 0 or 1; $i_1$ may have values of 0, 1, or 2; and $i_3$ may have values of 0, 1, 2, 3, or 4. The value of any index I may be found by summing together the products of the various components ($i_k$) multiplied by the grouping factor of that component. That is, in FIG. 11 it can be observed that $i_0$ appears in groups of one; 0, 1, 0, 1 and so forth; $i_1$ appears in groups of two; 00, 11, 22, 00, and so forth; and $i_2$ appears in groups of six, 000000, 111111, 222222, and so forth. Therefore, $i_0$ has a grouping factor of 1, $i_1$ has a grouping factor of 2, and $i_2$ has a grouping factor of 6. Therefore, for the decimal value of any index I, $I_{decimal} = 6i_2 + 2i_1 + i_0$.

In an N word by N bit MDA array the following data storage rule is observed: bit $B = (b_{n-1}, b_{n-2}, \ldots, b_1, b_0)$ of word $W = (w_{n-1}, w_{n-2}, \ldots, w_1, w_0)$ is stored in bit B of module $M = (b_{n-1} \ominus w_{n-1}, b_{n-2} \ominus w_{n-2}, \ldots, b_1 \ominus w_1, b_0 \ominus w_0) = B \ominus W$, where $b_k \ominus w_k$ means the difference between $b_k$ and $w_k$ modulo the radix $z_k$ and is an integer from 0 to $z_k - 1$. Similarly, bit B of module M is bit B of word $W = B \ominus M$. Note that if $z_k = 2$ for all $k$, then, $N = 2^n$ and the data in the memory is stored in the same pattern as that for the $2^n$ word by $2^n$ bit array previously described.

The module address line-array selection line connections in an N by N MDA array are quite unique. The set of address lines of each module are divided into n subsets with each subset associated with one definite component, $b_k$, of the bit address vector, B. That is, to address bit B of the module, subset $k$ of the address lines is set to a state corresponding to $b_k$ and that state is independent of any other components of B. Since $b_k = m_k - w_k$, $b_k$ may have any value between 0 and $z_k - 1$, that is, it may have $z_k$ different values. If the address lines are to receive binary signals then at least $\log_2(z_k)$ lines are needed in subset $k$ to handle all the possible $z_k$ states.

Into the whole memory there are $$\sum_{k=0}^{n-1} z_k$$

sets of array selection lines. These sets are labeled $x_{k,j}$ where $k$ takes on all values from 0 through $n-1$ and for a particular $k$, $j$ takes on all values of 0 through $z_{k-1}$. Each set, $x_{k,j}$, has at least $\log_2 (z_k)$ lines in it, therefore having the same $z_k$ possible states that subset $k$ of a module's address lines may have.

Each of the n subsets of a module's address lines is connection to one of the sets of array selection lines according to the following rule: subset $k$ of the address lines of module M is connected to set $x_{k,m_k}$ of the array selection lines, where $m_k$ is the $k^{th}$ component of M.

Referring again to FIG. 11 it can be seen that $N/z_k$ of the I indices have the same component, $i_k$, in the $k^{th}$ place of their address vector; that is, $i_0$ is a 0 or a 1 in each of 15, (30/2), of the I's, and similarly $i_1$ is a 0, 1, or 2 in each of 10, (30/3), of the I's, and $i_2$ is a 0, 1, 2, 3, or 4 in each of 6, (30/5), of the I's. It follows then that $N/z_k$ of the modules have the same component, $m_k$, in the $k^{th}$ place of their address vectors. Therefore set $x_{k,m_k}$ of the selection lines connects to $N/z_k$ modules. It should be observed that if $z_k = 2$ for all $k$ then $N = 2^n$ and the array selection line sets will be $x_{k,0}$ and $x_{k,1}$ which correspond to lines $x_k$ and $y_k$ in the prior discussion of the $2^n$ by $2^n$ MDA array.

Operation in bit-oriented mode requires that all modules be accessed at address B, the bit being sought. This may be accomplished if for all $k$ and all $m_k$ the state of set $x_{k,m_k}$ of the array selection lines is set to $b_k$. EAch module then accesses bit B of memory word $W = B \ominus M$. As a result, bit B of all words is accessed.

For word-oriented access recall the storage rule that $W = B \ominus M$. All bits of any word W may be accessed if for all $k$ and all $m_k$ the state of set $x_{k,m_k}$ of the array selection lines is set to $w_k \oplus m_k$ (where $\oplus$ means addition modulo $z_k$); now, each module accesses bit $(W \oplus M)$ of word $(B \ominus M) = W \oplus M \ominus M = W$. As a result all bits of word W are accessed.

For operation with mixed mode access, recall that in bit-oriented accessing the sets $x_{k,m_k}$ have the same rate, corresponding to $b_k$, for all $k$; and in word-oriented accessing the sets $x_{k,m_k}$ have different states, $w_k \oplus m_k$, for all $k$. To operate in mixed mode then it is necessary that some sets $x_{k,m_k}$ have the same state while other sets $x_{k,m_k}$ have different states. This may be accomplished by allowing an $n$-bit binary vector, S, determine the state of the $x_{k,m_k}$ sets. Now, if for all $k$, the sets $x_{k,0}$ of the array selection lines are designated to be the common array address lines then bit mode or word mode operation may be designated by allowing the state of the $x_{k,m_k}$ lines to be equal to the state of $x_{k,0} \oplus s_k m_k$. If $s_k$ is 0 then the sets $x_{k,m_k}$ have the same state for all $m_k$. If $s_k$ is 1 then the sets $x_{k,m_k}$ have different states. From the state of the $x_{k,m_k}$ lines and the storage rule that $W = B \ominus M$ it can be seen that each module M will access bit $(x_{n-1,0} \oplus s_{n-1} m_{n-1}, x_{n-2,0} \oplus s_{n-2} m_{n-2}, \ldots, x_{1,0} \oplus s_1 m_1, x_{0,0} \oplus s_0 m_0)$ of word $[x_{n-1,0} \oplus (s_{n-1} \ominus 1) m_{n-1}, x_{n-2,0} \oplus (s_{n-2} \ominus 1) m_{n-2}, \ldots, x_{1,0} \oplus (s_1 \ominus 1) m_1, x_{0,0} \oplus (s_0 \ominus 1) m_0]$. From the bit expression and the word expression it can be seen that if $s_k = 0$ for some $k$, then as $m_k$ runs through the ranges 0 through $z_k - 1$, component $k$ of the bit address vector stays fixed at $(x_{k,0})$ and component $k$ of the word address vector runs through the range 0 through $z_k - 1$. Likewise, if $s_k = 1$ for some $k$ then as $m_k$ runs through the range 0 through $z_k - 1$, component $k$ of the word address vector stays fixed at $(x_{k,0})$ and component $k$ of the bit address vector runs through all values. As a result, the memory will be accessed at P bits from each of Q words, where $$P = \pi_{(k:s_k=1)} z_k \text{ and } Q = \pi_{(k:s_k=0)} z_k.$$

Which bits of which words will be accessed is determined by the selection made on the common array address selection lines, $x_{k,0}$. Bit B of the words will be selected provided that $b_k = x_{k,0}$ wherever $s_k = 0$ and word W will be selected provided that $w_k = w_{k,0}$ wherever $s_k = 1$.

If an integer $j$, $1 \leq j \leq n-1$, is chosen such that $s_k = 0$ for all $k \geq j$ and $s_k = 1$ for all $k<j$, then $$P = \pi_{k=0}^{j-1} z_k \text{ and } Q = \pi_{k=j}^{n-1} z_k.$$

The memory will then be accessed as a set of P contiguous bits of every $P^{th}$ word, similar to the accessing in the $2^n$ by $2^n$ MDA array previously discussed.

It can be seen then that with N random-access memory modules each containing N bits an N word by N bit per word MDA array may be constructed. N must be made the product of n factors, $z_{n-1}$ through $z_0$, where $n \geq 1$. The address lines of each module must also be such that they can be divided up into $n$ sets where the number of possible binary states of the lines in set $k$ is at least $z_k$.

Thus far the discussion of the MDA array has been concerned with arrays which were square; that is, the number of bits in each word and the number of memory storage bits that could be accessed simultaneously was equal to the square root of the total number of bits stored in the array.

Now consider a non-square MDA array. For purposes of this description, an array will be called "under-square" if the number of birs that can be accessed simultaneously is less than the square root of the number of bits stored. A memory will be called "over-square" if the number of bits that can be accessed simultaneously is greater than the square root of the number of bits stored. Of course, it should be realized that in an MDA array the meaning of "words" and "bits" can be interchanged: an N-word by M-bit MDA array can also be considered to be an M-word by N-bit MDA array where a bit-oriented access in one becomes a word-oriented access in the other, and vice versa. Therefore, discussion shall only be made of non-square MDA arrays where the number of bits per word is less than the number of words. By changing the meanings of bits and words in this description, it can be made to apply equally well to MDA arrays where the number of bits per word is greater than the number of words. Also, in this description the assumption will be made that the number of words is an integral multiple of the number of bits per word; such an assumption is valid since memory sizes can usually be so adjusted.

An under-square array of N words and M bits per word allows simultaneous access to M of the NM stored bits, where N>M. Since a simultaneous access to only M bits is possible, a bit-oriented access will only access one bit from each of M words rather than from all N words. Multiple access features are required to permit bit-oriented access to all words.

Since it has been assumed that the number of words is an integral multiple of the number of bits per word, it follows that $N = qM$, where $q$ is an integer greater than 1. An MDA array may then be constructed from M random-access memory modules each containing N bits. The N words are divided into $q$ groups of M words each. Effectively then there are $q$ M word by M bit MDA arrays which may be stored and accessed as such. Each memory module has $N/q$ bits in each of the $q$ square arrays. FIG. 12 shows the division of a non-square array into $q$ square arrays, where $q = 3$. Some of the address lines of each module are used for specifying which of the $q$ groups is selected and the other address lines specify which word of the selected group is accessed. The address lines of each module which specify which group is selected are fed in parallel from one or more group selection lines. Other address lines of each module are connected in the same arrangement as for any M word by M bit memory. FIG. 13 illustrated the address connections for an eight word by four bits per word under-square array constructed with $2^n$ bit memory modules. Note that the group selection line goes to address line $a_2$ of each memory module and that the X-Y array selection lines follow the general connection rule discussed previously. When the group selection lines is at a logic 0 the least significant bits of each of the four modules may be accessed; that is, a four word by four bit per word memory array has been created. When the group selection line is at a logic 1 the four most significant bits of each module may be accessed, thus creating another four word by four bit per word memory array. For this example note that $q = 2$ and the MDA array operates like $q$ M word by M bit arrays with access to one array at a time. One section line selects which array is to be accessed and the other selection lines are used to access one bit of all words in the array, all bits of one word in the array, or some bits of some words in the array.

An over-square memory of N words and M bits per word allows simultaneous access to N of the MN stored bits, where N>M. If $N = qM$, where $q$ is an integer greater than 1, an MDA array may be constructed from N M-bit modules. FIG. 14 illustrates the construction of an over-square MDA array, where $M = 2$, $N = 8$, and $q = 4$. The construction is accomplished by following the same wiring and data storage rules as for any MDA array. However, since there are $q$ times as many words and modules as bits, modules are grouped in groups of $q$; all modules in the group having the same wiring connections.

FIG. 14a shows how this is done for the array under consideration utilizing $2^n$ bit memory modules. Module 000, 010, 100, and 110 make up one group while modules 001, 011, 101, and 111 make up another. FIG. 14*b* shows the storage pattern for the array and relates the words and the bits in each word to the modules of which the groups are made. For example, bit 0 of module (011) contains bit 0 of word (011) and bit 1 of module (011) contains bit 1 of word (010). By considering FIG. 14*a* and 14*b* together it can be seen that when $x = Y$ then one bit of all words will be accessed, and when $X = \bar{Y}$ then all bits of $q$ words will be accessed. It will be seen that this memory operates and may be accessed much the same as an M word by M bit memory except in place of each bit on the interface there appears a group of $q$ bits. A group of $q$ bits contains one bit of $q$ words. In bit-oriented accessing, access will be made to one bit of all N words; in word-oriented access, access will be made to all M bits of each of $q$ words. Note that if the array were to follow the storage formula of $M = B\oplus\overline{W}$ then in word-oriented access, access could be made to all bits of $q$ successive words. When the array follows the formula $M = B \oplus W$ as in FIG. 14*b*, then access is made in groups of $q$ to all bits of every $M^{th}$ word.

Although in the aforementioned description of under-square and over-square arrays, the discussion covered the general case of N word by M bit arrays wherein the memory modules would be the type described previously in the N word by N bit description, it becomes readily apparent from the examples above that either of these arrays may be constructed from the $2^n$ bit memory modules discussed in conjunction with the $2^n$ word by $2^n$ bit array. If in the under-square description above $N = 2^n$ and $M = q2^n$, where $q$ is an integral factor of N; and if in the over-square description above $M = 2^n$ and $N = q^n$, where $q$ is an integral factor of M, then the descriptions clearly cover the specific cases of such arrays constructed from $2^n$ bit memory modules.

It has been shown that digital computer memory arrays may be constructed such that access may be made to the storage bits of the arrays in any one of three distinct modules. Such arrays may generally be constructed from any encoded memory modules. However, most generally such arrays will be constructed from $2^n$ bit address line-encoded binary solid state memory modules. Such arrays need not be square but may be constructed such that simultaneous access may be made to either less than the square root of the total number of bits stored (under-square) or to more than the square root of the total number of bits stored (over-square). In either the square, under-square, or over-square cases, access may be made to the storage bits of the array system in each of three distinct modes. The storage array systems presented above are unique in that when used in conjunction with a permutation network, the subject of a co-pending patent application previously designated, the patterns allow for consistent, convenient ordering of the accessed data on a data interface for all three modes of operation and does so with a minimal amount of hardware which makes such systems more reliable and less expensive than those of any other proposed approach.

While in accordance with the patent statutes only the best known embodiments of the invention have been illustrated and defined in detail, it is to be understood that the invention is not limited thereto or thereby, but that the inventive scope is defined in the appended claims.

What is claimed is:

1. A multi-dimensional access solid state memory array comprising:

$2^n$ address line-encoded memory modules, each module containing $2^n$ data storage bits and having n address lines associated therewith whereby each of the data storage bits might be accessed, the memory modules being consecutively indexed with n-element binary vectors M and the address lines being consecutively indexed by integers;

a first set of $n$ array selection lines consecutively indexed with the same integers indexing the address lines, the $k^{th}$ array selection line of the first set being connected to the $k^{th}$ address line of all memory modules having the $k^{th}$ element of their binary vector index M equal to zero, where $k$ is an integer between 0 and $n-1$ inclusive; and a second set of $n$ array selection lines consecutively indexed with the same integers indexing the address lines, the $k^{th}$ array selection line of the second set being connected to the $k^{th}$ address line of all memory modules having the $k^{th}$ element of their binary vector index M equal to one, where $k$ is an integer between 0 and $n-1$ inclusive.

2. The multi-dimensional access array as recited in claim 1 which further includes a first and second circuit means respectively connected to the first and second set of array selection lines for setting the states of the module address lines connected thereto.

3. The multi-dimensional access array as recited in claim 2 wherein the first and second circuit means respectively comprise first and second digital registers.

4. The multi-dimensional access array as recited in claim 2 wherein a third circuit means is provided intermediate the second circuit means and the second set of array selection lines, the third circuit means connected to and receiving the output state from the first and second circuit means and supplying the resultant output states to the second set of array selection lines.

5. The multi-dimensional access array as recited in claim 4 wherein the first and second circuit means comprise binary logic registers and the third circuit means comprises a plurality of RING SUM gates.

6. A multi-dimensional access memory array, comprising:

$2^n/q$ address line-encoded memory modules, where $n$ is greater than 1 and $q$ is an integral factor of $2^n$, each memory module having $n$ address lines associated therewith whereby each of the data storage bits may be accessed, the memory modules being consecutively indexed with binary vectors M and the address lines being consecutively indexed with integers;

a first set of array selection lines, fewer than $n$, consecutively indexed with integers, the $k^{th}$ array selection line of the first set being connected to the $k^{th}$ address line of all memory modules having the $k^{th}$ element of their binary vector index M equal to zero;

a second set of array selection lines, fewer than $n$, consecutively indexed with integers, the $k^{th}$ array selection line of the second set being connected to the $k^{th}$ address line of all memory modules having the $k^{th}$ element of their binary vector index M equal to one; and group selection lines connected to all remaining address lines, the group selection lines providing means for operatively dividing the $2^n/q$ modules into $q$ square arrays.

7. A multi-dimensional access memory, comprising:

a plurality N of M-bit memory modules, where N equals $q$M and $q$ is greater than 1, the modules being grouped in M groups of $q$ modules each, each module having address lines connected thereto for accessing the data storage bits thereof, all $q$ modules of each group having corresponding address lines connected together in parallel, the M groups being indexed by consecutive binary vectors and the module address lines being indexed with integers;

a first set of array selection lines indexed with integers, the $k^{th}$ selection line of the first set being connected to the $k^{th}$ module address line of the modules in those groups having the $k^{th}$ element of the group binary vector index equal to zero; and a second set of array selection lines indexed with integers, the $k^{th}$ selection line of the second set being connected to the $k^{th}$ module address lines of those modules in those groups having the $k^{th}$ element of the group binary vector index equal to one.

8. A multi-dimensional access memory array, comprising:

a plurality of address line-encoded memory modules, each module containing data storage bits accessable by the address lines, the modules being indexed by consecutive binary vectors and the address lines being indexed by consecutive integers;

first circuit means connected to the $k^{th}$ address line of all memory modules having the $k^{th}$ element of their binary vector index equal to zero, the first circuit means supplying binary electrical signals to the modules; and second circuit means connected to the $k^{th}$ address line of all memory modules having the $k^{th}$ element of their binary vector index equal to one, the second circuit means supplying binary electrical signals to the modules.

9. The multi-dimensional access memory array as recited in claim 8 wherein the first and second circuit means are interconnected such that the output of the second circuit means is a function of the output of the first circuit means.

10. The multi-dimensional access memory array as recited in claim 8 wherein the first circuit means comprises a first register and the second circuit means comprises a second register and a plurality of ring sum gates, the ring sum gates connected to pairs of corresponding outputs of the first and second registers.

11. The multi-dimensional access memory array as recited in claim 8 wherein the plurality of memory modules comprise $2^n$ such modules, each module containing $2^n$ data storage bits accessable by n address lines connected to each module and where each binary vector comprises $n$ elements, where $n$ is an integer greater than 1.

12. The multi-dimensional access memory array as recited in claim 11 wherein the first circuit means comprises a first $n$-bit register and the second circuit means comprises a second $n$-bit register and $n$ ring sum gates, each ring sum gate connected to an output of the first $n$-bit register and a corresponding output of the second n-bit register.

13. A multi-mode accessable data storage array, wherein access may be made to all bits of one word, one bit of all words, or some bits of some words, comprising:

a plurality of addressable data storage elements wherein data may be stored as bit-comprised words;

a first circuit means connected to the data storage elements for supplying a first address thereto;

a second circuit means for supplying a digital mode-of-access code; and logic gating means connected to the first and second circuit means and receiving and combining the outputs thereof for supplying a second address to the data storage elements, the equivalency of the binary values of corresponding elements of the first and second addresses controlling the mode of access to the data storage array.

14. The data storage array as recited in claim 13 wherein data storage elements comprise address line-encoded solid state memory modules.

15. The data storage array is recited in claim 14 wherein the first circuit means comprises a first binary data register.

16. The data storage array as recited in claim 15 wherein the second circuit means comprises a second binary data register and the gating means interconnect corresponding outputs of the first and second binary data registers.

17. The data storage array as recited in claim 13 wherein the plurality of data storage elements comprises $2^n$ address line-encoded binary solid state memory modules, each module containing $2^n$ data storage bits addressable by $n$ address lines, where $n$ is an integer greater than one, the modules each indexed by unique consecutive $n$-element binary vectors and wherein the first and second circuit means each have $n$-outputs, the $k^{th}$ output of the first circuit means connected to the $k^{th}$ address line of all memory modules having the $k^{th}$ element of their binary vector index equal to a first binary value and the $k^{th}$ output of the second circuit means connected to the $k^{th}$ address line of all memory modules having the $k^{th}$ element of their binary vector index equal to a second binary value.

18. The data storage array as recited in claim 17 wherein the first circuit means comprises a first $n$-bit register, the second circuit means comprises a second $n$-bit register and the logic gating means comprises $n$ ring sum gates, the ring sum gates receiving corresponding pairs of outputs from the first and second $n$-bit registers.

* * * * *

UNITED STATES PATENT OFFICE

CERTIFICATE OF CORRECTION

Patent No. 3,800,289 Dated March 26, 1974

Inventor(s) Kenneth E. Batcher

It is certified that error appears in the above-identified patent and that said Letters Patent are hereby corrected as shown below:

Column 2, line 6, after "where" insert -- $\ominus$ --.

Column 6, line 23, should read " if $X = (x_{n-1}, x_{n-2}, \ldots, x_1, x_0)$"
line 24, should read "$\overline{X} = (\overline{x}_{n-1}, \overline{x}_{n-2}, \ldots, \overline{x}_1, \overline{x}_0)$ Column 8, line 11, change " $_k$" to --$x_k$--; line 38, change"X SM" to --X $\oplus$SM-- in all three occurrences; line 41, change "then $y_k = \overline{x}_k$" to --then $y_k = x_k$--; line 42, should read "for all $k \geq j$ (bit mode) and $y_k = \overline{x}_k$ for all $k < j$ (word".

Column 9, line 4, change "fo" to --for--; lines 65 & 66, should read " $=x_k$ and $w_k = x_{n-1-k} \oplus m_{n-1-k}$ for all $k \geq j$; and if $s_k = 1$ for all $k < j$ then $b_k = x_k \oplus m_k$ and $w_k = x_{n-1-k}$ for all $k < j$."

Column 10, line 25, change "$(n_{n-1},$" to --$(i_{n-1},$--.

Column 11, line 13, change "connection" to --connected--.

Column 12, line 42, change "birs" to --bits--.

Column 14, line 22, change "$N = q^n$" to --$N = q^{2n}$--; line 29, change "modules" to --modes--.

Signed and sealed this 22nd day of October 1974.

(SEAL)
Attest:

McCOY M. GIBSON JR.
Attesting Officer

C. MARSHALL DANN
Commissioner of Patents